Nov. 9, 1937.  H. KÜPPENBENDER ET AL  2,098,873
TARGET PRACTICING DEVICE
Filed Aug. 20, 1936  3 Sheets-Sheet 1
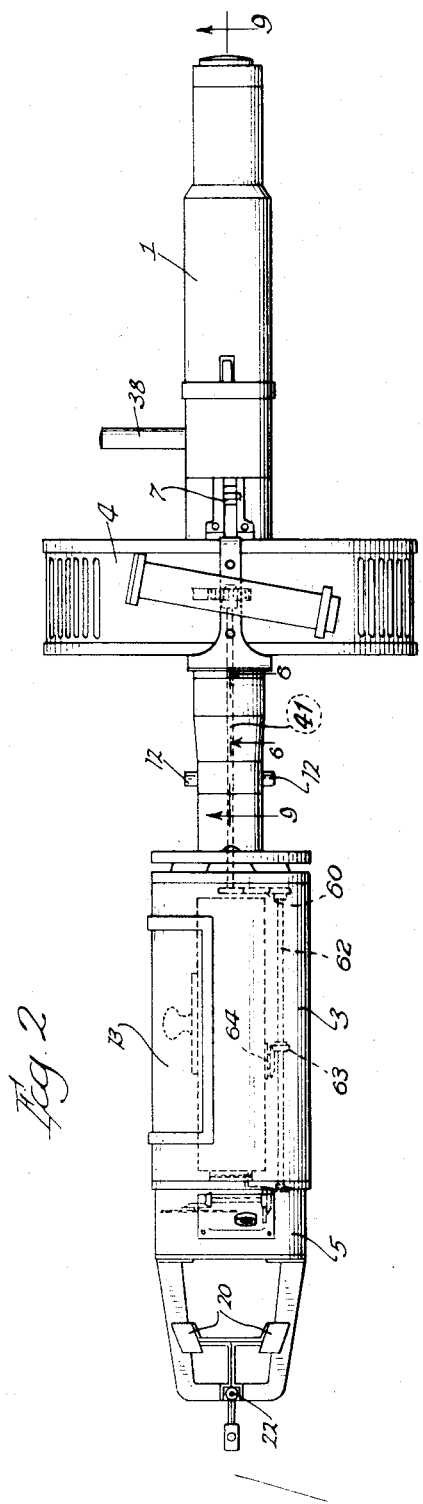

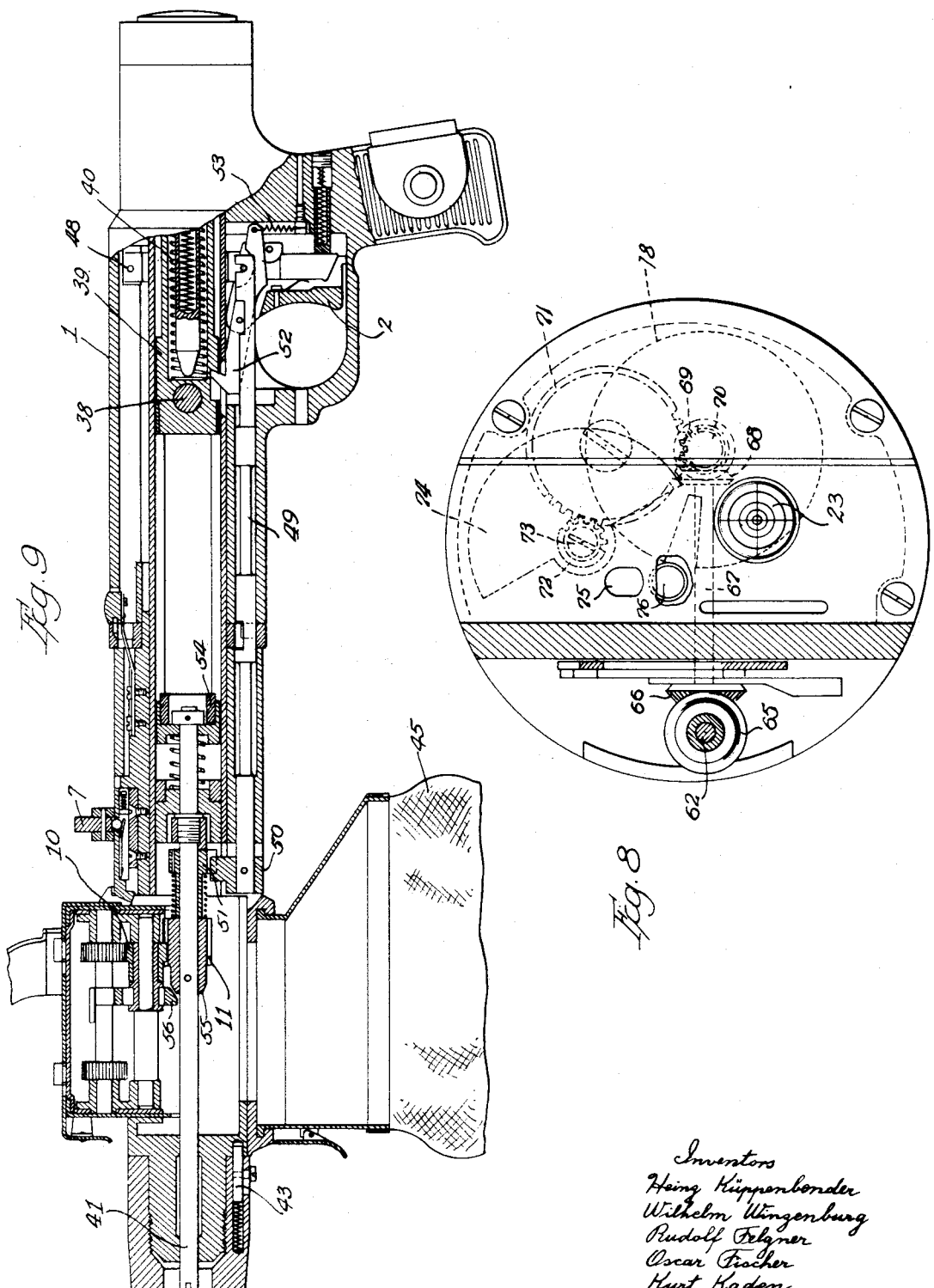

Patented Nov. 9, 1937

2,098,873

UNITED STATES PATENT OFFICE 2,098,873

TARGET PRACTICING DEVICE

Heinz Küppenbender, Wilhelm Winzenburg, Rudolf Felgner, Oscar Fischer, and Kurt Kaden, Dresden, Germany, assignors to Zeiss Ikon Aktiengesellschaft, Dresden, Germany Application August 20, 1936, Serial No. 96,912
In Germany August 3, 1935

7 Claims. (Cl. 88—16)

The invention relates to improvements in target practicing devices and particularly pertains to a device which permits "hits" or "misses" to be recorded and examined for aerial as well as terrestrial or other targets.

The principal object of the invention is to combine a target practice device with a series or motion picture camera of novel construction and arrangement, which is adapted to photograph the target, and with other means permitting the determination of the number and quality of hits which might have been produced in a series encounter.

In accordance with the invention the customary fire arm, for instance a machine gun, as preferably employed in aeroplanes, is substituted by a motion picture camera which is shaped and operated in substantially the same manner as a machine gun. This camera is driven by a spring motor positioned in a spring drum, and the finder device of the camera has the same form as the sighting or aiming device of the machine gun.

It is also an object of the invention to provide the pictures produced by the camera with indications which not only show a representation of the object aimed at, but also the exact time at which the camera was operated. The pictures furthermore may show a field on which the class of the military manoeuvre and the name of the operator is inscribed as well as an image of a weather vane forming part of the apparatus.

An examination of the motion picture film after the exercises have been completed will reveal the number of hits scored and permits the determination of the winning party in the sham battle.

These and other objects are obtained by certain novel elements and combination of parts, all as will be hereinafter more fully described and claimed.

Figure 3:
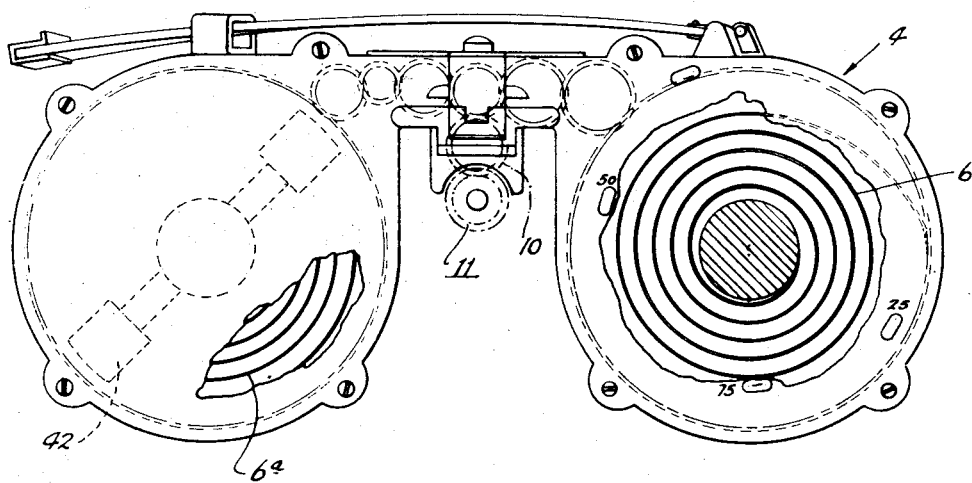
Figure 4:
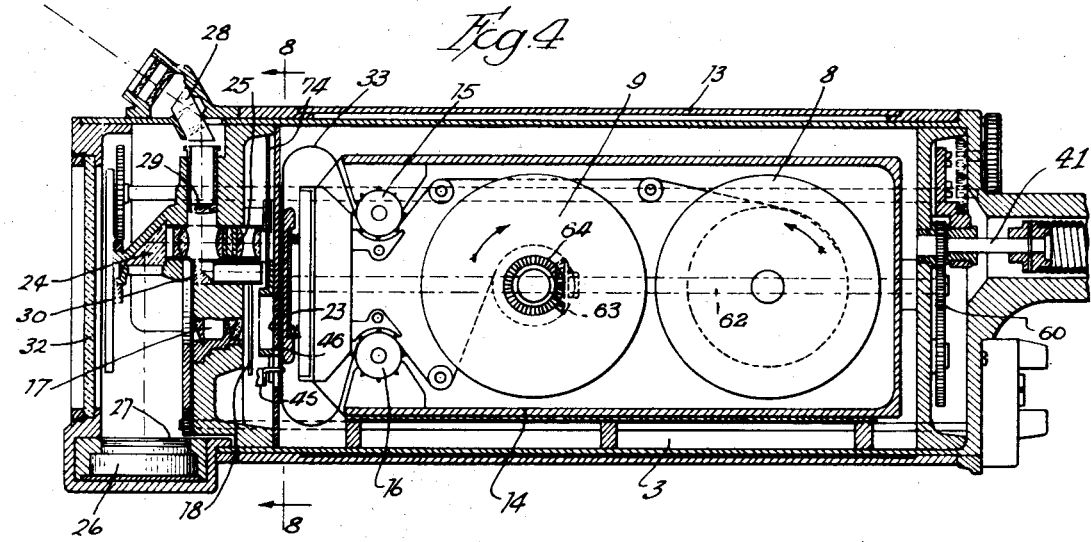
Figure 5:
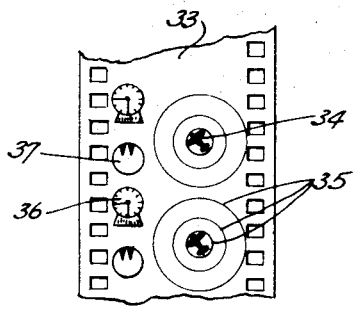

In the drawings:
Fig. 1 is an elevation view of the camera-target practicing device.
Fig. 2 is a plan view of the same.
Fig. 3 is an end view of the spring motor housing partially broken away and in section.
Fig. 4 is a longitudinally cross sectional view of the motion picture camera.
Fig. 5 shows a section of the motion picture film after its exposure and development.
Fig. 6 is a sectional view along the line 6—6 of Fig. 2, Fig. 7 is a cross-sectional view along the line 7—7 of Fig. 1.
Fig. 8 shows in an enlarged scale a cross-sectional view in the plane indicated by the line 8—8 in Fig. 4, and
Fig. 9 is a longitudinal sectional view substantially along the line 9—9 of Fig. 2.

The essential parts of the target practicing device comprise the stock 1 with the trigger 2, the film compartment 3 in which the film supply spool 8 and the film take-up spool 9 are positioned, the spring drum 4 which contains the springs 6 and 6a for driving the film and which is detachably mounted on the stock 1 (over a suitable opening in the stock), and the optical equipment 5 at the front end of the film compartment.

The spring drum casing 4 has the same shape as the casing of the double drum of a machine gun. This spring drum is also attached in the same manner as the double drum of the machine gun. The entire assembly is movably supportable on trunnions 12 in the manner of machine guns and carries the same sights 21 and 22 as a machine gun. These sights 21 and 22 are also mounted and used in the same manner as on a machine gun. A weather vane 20 is also provided.

The entire stock 1 including the trigger 2 is detachably secured and may be removed from the spring drum 4 by releasing the locking lever 7. The film compartment 3 is connected with the stock 1 by a bayonet-thread as shown in the Figs. 6 and 7. A slidable bolt 43 (Fig. 1) is provided for locking this bayonet-thread. Underneath the spring drum 4 a bag 45 for empty shells is attached in the same manner as is customary on a machine gun. The spring motor drives the film advancing mechanism by means of the gears 10 and 11.

Fig. 3 illustrates details of the spring motor. The latter consists of two oppositely wound drive springs 6 and 6a and a governor 42 which controls the speed of the drive mechanism. The power of this spring motor is determined in accordance with the number of shots of a customary cartridge double drum. When the spring motor has run off, it has to be removed in the same manner as a cartridge double drum and has to be replaced by another one. For this replacement the operator has to perform the same manipulations which he would have to perform if he had to exchange a cartridge double drum.

According to Figs. 2 and 4, the film compartment 3 comprises a casing provided with a slidable cover 13. This casing is adapted to receive an exchangeable container 14 wherein is disposed the film supply spool 8, the film take-up spool 9 and the film feed rollers 15 and 16. A film advancing mechanism, of which only a portion of the film engaging gripper 45 is shown in Fig. 4, is actuated by the spring motor and is adapted to move the film 33 intermittently through the film gate 46 arranged behind a lens system 17 which forms a part of the optical equipment 5. The exposure of the film is controlled by a sector shutter 18 which also may be driven by the spring motor. The other parts of the optical equipment 5 consists of a plate 23 with a geometrical figure corresponding for instance to target circles, a prism 24 and a special lens 25 for producing on the film pictures of a time piece 26 and an inscription plate 27, and a Dove-prism 28, a lens 29 and a prism 30 for recording the weather vane 20 upon the film. The inscription plate 27 is arranged in the same plane as the time piece 26, it is exchangeable and adapted to have inscribed thereupon in a black color information regarding the manoeuvre, the date and the name of the party who operates the device. The time piece 26 as well as the plate 27 are illuminated by exterior light.

The front of the optical equipment is covered by a glass plate 32 which protects the optical parts against dirt and injury.

Fig. 5 shows a portion of the developed film 33. In the present instance, the film shows that the target practicing device was correctly adjusted, for the image of the object to be fired upon, (an aeroplane) appears in the bull's-eye 34. The circles of the target are indicated at 35. The time of the operation of the device is indicated by the image 36 of the time piece and at 37 an image of the weather vane with a circular sight line is recorded.

The operation of the device is as follows:

By moving the handle 38 rearwardly the bolt 39 (Fig. 1) is tensioned in the same manner as when a machine gun is operated. When the trigger 2 is actuated the lever 47 pivoted at 48 is rotated anti-clockwise and draws the rod 49 rearwardly. This has the effect that a member 50 on the rod 49 is moved toward the right with respect to a member 51 on the shaft 41. At the same time the trigger is actuated the pawl 52 is moved out of engagement with the bolt 39 due to the fact that upon rotation of the lever 47 the pawl 52 is urged downwardly against the action of the spring 53. The bolt 39 being released, is driven forwardly by the spring 40, and hits the member 54, which in turn pushes the shaft 41 toward the left. The combined relative axial movement between the shaft 41 and the rod 49 causes a disengagement of the members 51 and 50, so that the shaft 41 is free to be rotated by the spring motor. When the shaft 41 is moved axially toward the left the cam-shaped hub extension 55 of the gear 11 engages a member 56 belonging to the spring motor. The member 56 normally locks the springs 6 and 6ª of the spring motor against unwinding, but when it is engaged by the extension 55 it is lifted and thereby is moved out of locking position. The springs 6 and 6ª are now released for driving by means of the gearings indicated in dotted lines in Fig. 3 and also partly shown in Fig. 9, the gear 10, which in turn drives the gear 11 and therewith the main shaft 41.

According to Figs. 2 and 4 the main shaft 41 drives by means of a gearing 60 a shaft 62 mounted within the casing of the film compartment 3. The shaft 62 is drivingly connected intermediate its ends by bevel gears 63 and 64 with the take-up spool 9. Adjacent the front end of the casing the shaft 62 is connected by bevel gears 65 and 66 (Fig. 8) with a traverse shaft 67, which in turn is connected by bevel gears 68 and 69 with the shaft 70 on which the shutter plate 18 is mounted. The shaft 70 drives also a gear 71 meshing with a gear 72 on a shaft 73 which has a shutter plate 74 attached thereto for controlling the picture apertures 75 and 76 in rear of the lens 25 and the prism 30 respectively. The main shaft 41 drives also by means of gears the film engaging gripper 45 of the intermittent film feed mechanism. The film feed rollers 15 and 16 in the container 14 are likewise driven. The film is moved successively past the points where records of the time piece, the weather vane and the object are recorded, and then it is wound upon the take-up reel 9.

What we claim as our invention is:

1. In a machine gun camera, a camera proper which has a main operating shaft and a stock with trigger mechanism and having an opening, a readily detachable spring-motor-unit, means detachably securing said unit, as such, in place in co-operative position with relation to said opening in said stock, said unit and said main operating shaft each having engaging power-transmitting elements designed to be brought into operative relation with one another by placement of said unit in position on the stock, and means actuated by said trigger mechanism for controlling the operation of said spring-motor.

2. In a machine gun camera, a camera proper, a recessed stock extending rearwardly from the camera proper and containing a trigger mechanism, a main camera-operating shaft for said camera proper and having a gear, said trigger mechanism including releasable means to restrain said camera-operating shaft from operation, a spring-motor-unit including tensioned springs and power-transmitting instrumentalities all enclosed in a suitable case, said power-transmitting instrumentalities including a gear to project into the recess of the stock and, when said unit is placed in position on the stock, to mesh with said main shaft gear, and means to hold said case with its contents detachably as a unit on said stock.

3. In a machine gun camera, the combination with a camera proper having a main operating shaft which has a power-transmitting element, and a stock having a trigger mechanism and having an opening; of a pre-wound spring-motor-unit which includes a support, a motor-spring and power-transmitting mechanism; means detachably holding said unit in co-operative position with relation to said opening in said stock with its power-transmitting mechanism operatively engaging said power-transmitting element of said shaft; and means actuated by said trigger mechanism for controlling the action of said motor-spring.

4. In a machine gun camera, the combination with a camera proper having a main operating shaft which has a power transmitting element, and a stock having a trigger mechanism and having an opening; of a pre-wound spring-motor-unit which includes a support, a motor-spring and power-transmitting mechanism; means detachably holding said unit in co-operative position with relation to said opening in said stock with its power-transmitting mechanism operatively engaging said power-transmitting element of said shaft; and means actuated by said trigger mechanism for controlling the action of said motor-spring, said spring-motor-unit including a device for holding the motor-spring against action while the unit is detached and said trigger mechanism including means, operative after said unit is attached, for releasing said holding device.

5. In a machine gun camera, the combination with a camera proper having a main operating shaft which has a power transmitting element, and a stock having a trigger mechanism and having an opening; of a spring-motor-unit which includes a support, a motor-spring and power-transmitting mechanism; means detachably holding said unit in co-operative position with relation to said opening in said stock with its power-transmitting mechanism operatively engaging said power-transmitting element of said shaft; and means actuated by said trigger mechanism for controlling the action of said motor-spring, said spring-motor-unit including a device for holding the motor-spring against action while the unit is detached and said trigger mechanism including means, operative after said unit is attached, for releasing said holding device.

6. A target practice device comprising a motion picture camera simulating in appearance that of a machine gun and adapted for photographing the object aimed at upon a motion picture film, said motion picture camera consisting of a front portion containing a lens, a shutter, a film advancing means and film supply and take-up means, and a rear portion simulating the stock of a machine gun containing a drive shaft, a trigger and means controlled by said trigger for connecting said drive shaft with said shutter and film advancing means; and a spring-motor-unit comprising a holder, motor-springs and power-transmitting gearing in the holder, said gearing including a final gear; said rear portion having provisions to operatively receive said spring-motor-unit; a gear on said drive shaft with which said final gear engages upon placing the unit in position on the stock; and means detachably holding said unit, as such, in place on the stock.

7. A target practice device comprising a motion picture camera simulating in appearance that of a machine gun and adapted for photographing the object aimed at upon a motion picture film, said motion picture camera consisting of a front portion containing a lens, a shutter, film advancing means and film supply and take-up means, and a rear portion simulating the stock of a machine gun containing a drive shaft, a trigger and means controlled by said trigger for connecting said drive shaft with said shutter and film advancing means; and a spring-motor-unit comprising a holder, motor-springs and power-transmitting gearing in the holder, said gearing including a final gear; a gear on said drive shaft with which said final gear engages upon placing the unit in position on the stock; and means detachably holding said unit, as such, in place on the stock; said holder comprising a case having two spring-holding pockets connected together in spaced relation by a cross portion, said cross portion having a projection in which said final gear is located, said projection having an opening for access to said final gear; said rear portion having an opening to receive said projection, said spring-holding pockets lying to either side of said rear portion when the unit is in position; in virtue of all of which the same technique may be employed in "shooting" pictures and loading the device as is practiced in shooting and loading a machine gun that shoots bullets.

HEINZ KÜPPENBENDER.
WILHELM WINZENBURG.
RUDOLF FELGNER.
OSCAR FISCHER.
KURT KADEN.